United States Patent [19]
Adams

[11] Patent Number: 4,933,935
[45] Date of Patent: Jun. 12, 1990

[54] COMMUNICATIONS SYSTEMS

[75] Inventor: John L. Adams, Aldringham, England

[73] Assignee: British Telecommunications plc, London, England

[21] Appl. No.: 330,947

[22] Filed: Mar. 27, 1989

Related U.S. Application Data

[63] Continuation of Ser. No. 753,993, Jul. 11, 1985, abandoned.

[30] Foreign Application Priority Data

Jul. 13, 1984 [GB] United Kingdom ............... 8417910

[51] Int. Cl.$^5$ ............................. H04J 3/24; H04J 3/00
[52] U.S. Cl. .................................. 370/85.7; 370/94.1; 370/95.1
[58] Field of Search ................ 370/85, 89, 86, 94, 370/85.15, 85.12, 85.5, 85.1, 85.7, 94.1, 60, 95.3, 95.1; 340/825.5, 825.51, 825.05

[56] References Cited

U.S. PATENT DOCUMENTS

| | | | |
|---|---|---|---|
| 3,680,056 | 7/1972 | Kropfl | 370/86 |
| 4,199,661 | 4/1980 | White et al. | 340/825.5 |
| 4,383,315 | 5/1983 | Torng | 370/89 |
| 4,412,326 | 10/1983 | Limb | 370/85 |
| 4,459,588 | 7/1984 | Grow | 370/89 |
| 4,538,263 | 8/1985 | Gabrielli et al. | 370/89 |
| 4,556,972 | 12/1985 | Chan et al. | 370/94 |
| 4,566,097 | 1/1986 | Bederman | 340/825.5 |
| 4,587,651 | 5/1986 | Nelson et al. | 370/89 |
| 4,592,049 | 5/1986 | Killat et al. | 370/89 |
| 4,661,952 | 4/1987 | Von Sichart et al. | 370/89 |
| 4,663,748 | 5/1987 | Karbowiak et al. | 370/89 |
| 4,707,831 | 11/1987 | Weir | 370/89 |
| 4,718,061 | 1/1988 | Turner | 370/89 |

OTHER PUBLICATIONS

IEEE Global Telecommunications Conference 1983, Mark, "Integrated Voice/Data Services on a Dual Ring Local Area Network" 11.1.1–11.1.5
Local Networks and Distributed Office Systems vol. 1, 1982, pp. 401–410, Leslie et al., "Organisation of Voice Communication on the Cambridge Ring".
Network for Blocking Switching of Data–Pierce, BSTJ vol. 51, No. 6, Aug. 1972.
Tymnet–"A Terminal Oriented Communications Network" Proc. NCC vol. 38, (1971).
*FDDI Token Ring–Draft Standard* Software & Microsystems, vol. 2, No. 4, 8/83–Local Area Networks–an introduction–D. Hutchinson.
The Cambridge Digital Communications Ring–Wilkes et al.–Proceedings of the LACN Symposium, May 1979.
Nishida et al., "Prioritized Token Passing Method in Ring-Shaped Local Area Networks", 1983.
Zafiropuio et al., "Signaling and Frame Structures in Highly Decentralized Loop Systems", 1972.
Mokhoff, "Networks Expand as PBXs Get Smarter", 1984.
Yu et al., "Suggestions for Control Mechanism for Reducing the Number of Priority Changes in an Adaptive Loop", 1980.
IBM Technical Disclosure Bulletin, vol. 26, No. 11, (List continued on next page.)

Primary Examiner—Reinhard Eisenzopf
Assistant Examiner—Curtis Kuntz
Attorney, Agent, or Firm—Nixon & Vanderhye

[57] ABSTRACT

A communications network comprises a plurality of stations which can communicate via a ring. Information is transmitted from one station to another in message blocks which circulate around the ring. The message blocks include control bits and a protocol is employed which ensures that no one station can monopolize the available message blocks. Also described is a technique which allows each station independently to assess the current spare capacity of the network. A link multiplexer may be used in conjunction with rings and incorporates a similar protocol. It provides access to a link to queues of message blocks provided queue thresholds have not been reached.

53 Claims, 7 Drawing Sheets

OTHER PUBLICATIONS

Apr. 1984, pp. 5991–5992: "Multiple Frame Transmission for Single Token".

Local Networks for Computer Communications, Proceedings of the IFIP Working Group 6.4 27–29, Aug. 1980.

The Bell System Technical Journal, vol. 51, No. 6, Jul.–Aug. 1972, W. J. Kropfl: "An Experimental Data Block Switching System".

AT&T Bell Laboratories Technical Journal, vol. 63, No. 2, Feb. 1984, J. W. Mark and J. O. Limb: "Integrated Voice/Data Services on Fasnet".

Office Information Systems: J. O. Limb, Bell Laboratories "Fasnet: Proposal for a High Speed Local Network".

AT&T Bell Laboratories Technical Journal, vol. 63, No. 8, Oct. 1984, Z. L. Budrikis and A. N. Netravali: "A Packet/Circuit Switch".

COMMUNICATIONS SYSTEMS

This is a continuation of application Ser. No. 06/753,993, filed Jul. 11, 1985, now abandoned.

TECHNICAL FIELD

This invention relates to communications systems such as communications networks and multiplexers.

Systems providing for the transport of encoded signals on a communications link are well known. Many such systems are used for data signals which are not time critical; examples of such systems are packet switching networks and many local area networks (LANs). Many others can carry speech adn video signals, where transmission delays above certain limits are unacceptable, but not data signals.

BACKGROUND ART

IBM Technical Disclosure Bulletin, Vol. 26 No. 11 Apr. 1984 p5991-2 describes a token ring communication system for transmitting several frames before a free token is released. Token ring systems allow only a single token at a time onto the ring; messages can be long and different messages usually have different lengths. Such systems are used for carrying data. The rules for the technique described in the IBM Bulletin ensure that a station can have access to the ring for a certain time, before releasing the token. There is no mechanism for ensuring that access delays are kept within set limits, and the ring could be unsuitable for carrying services such as voice or low bit rate video which have maximum delay requirements. There are obvious advantages in being able to use a single system for both data and speech and other synchronous services. For example, there would be a major cost saving over separate data and speech networks. However, there are numerous problems in achieving a satisfactory dual system particularly at the bit rates required to transport voice and low bit-rate video. Existing protocols for low bit rate systems would suffer from some or more of the following drawbacks: excessive delay and/or jitter; inability to offer guaranteed bandwidth for the duration of delay sensitive service calls; no effective overload control; and inefficient use of bandwidth.

BRIEF SUMMARY OF INVENTION

According to the present invention there is provided a communications method system for carrying encoded delay sensitive and non-delay sensitive messages comprising a plurality of locations for storing imformation to be carried in message blocks on a link, wherein each location has an allocation of d blocks and is entitled to transmit one block onto the link whenever a block is waiting at that location, but if d blocks are transmitted onto the link from a location, that location loses its entitlement to transmit further blocks until a further allocation is received, wherein said further allocation is received following a test of all locations for loss of entitlement and wherein no location is in a preferential position with regard to the interval of time between successive allocations.

The system suitably includes a counter for each location and the counters are reset when every location is inhibited or empty.

Prior to accepting a new time-critical call, the rate of resets may be compared with the maximum allowable interval between resets to determine whether the call can be accepted without the reset interval rising above the maximum, and on acceptance of the call, increasing the allocation d for its location.

Communications network such as local area networks (LANs), metropolitan area networks (MANs), switches, etc., allow a number of stations to communicate with each other by way of a signal carrying link. Various types of link are knwon, the one with which an aspect of the present invention is concerned being known as a ring or loop. In this type of arrangement each station, which can incorporate a number of devices, is connected to a particular point on the ring known as a node.

In a slotted ring type network information in digital form is transmitted from one station to another in slots or blocks which circulate around the ring. A transmitting station seizes available slots in order to transmit its information to the other station. The slots include one or more bits into which can be inserted a code indicative of the destination station. In some types of slotted ring networks the information carrying slot returns to the source station before it is emptied of data. This is wasteful of bandwidth since it could have been used by other stations along that part of the ring between destination and source station. Thus slotted ring networks have been developed in which the information carrying slots are emptied at the destination station. This arrangement can in theory be used to transfer more information in a given time but there is a problem in that it is possible for some stations to monopolize the slots.

An aspect of the present invention is concerned with a communications network of the slotted ring type in which slots are emptied at destination stations and in which access to the ring is distributed to the stations so that one or more stations cannot monopolize the ring and so that each station is guaranteed a certain minimum bandwidth.

Accordingly, the present invention provides a communications network comprising a plurality of stations which can communicate via a ring, information in digital form being transmitted from one station to another in message blocks which circulate around the ring, each message block comprising a first group of control bits and a second group of data bits, each station when it requires to transmit assuming an active state in which it inserts digitally encoded information into empty blocks for transmission to a destination station, said station if it has inserted information into d blocks enters a state in which it cannot gain access to empty blocks for the transmission of information until it is reset in response to recognition of an empty block having travelled at least once around the ring, said resets being issued to all stations so that no station is in a preferential position with regard to the rate of reception of resets.

The control bits of each block can include a bit which when that block is empty can be set to a particular state by an inhibited station. Each station which senses an empty block having a said bit which is set may be arranged to set a further control bit. A block which has said two control bits set serves to initiate said resetting of stations. Each station can have a different d value associated therewith, and the d value of a particular station can be variable.

Thus it will be seen that a station which is transmitting is allowed to seize only a given number of blocks before it has to pause to allow other stations which require to transmit to gain access to the ring. Any station which has paused in only allowed access to the ring after the other stations requiring to transmit have had the opportunity of using their allocation of message blocks.

It is often desired to transmit informtion between rings and loops, or other networks, on communications links. Another aspect of the present invention provides a link multiplexer which enables queues of blocks to be transmitted to a link without allowing any queue to hog the link.

The invention thus provides a link multiplexer comprising a plurality of queues for message blocks to be transmitted onto a communications link and a controller to give an allocation of d blocks to each queue, wherein if d blocks are transmitted onto the link from a queue, that queue is inhibited from transmitting further blocks until a further allocation is received.

BRIEF DESCRIPTION OF DRAWINGS

The invention will now be described, by way of example, with particular reference to the accompanying drawings. In the drawings.

DESCRITPION OF PREFERRED EMBODIMENTS

Figure 1:
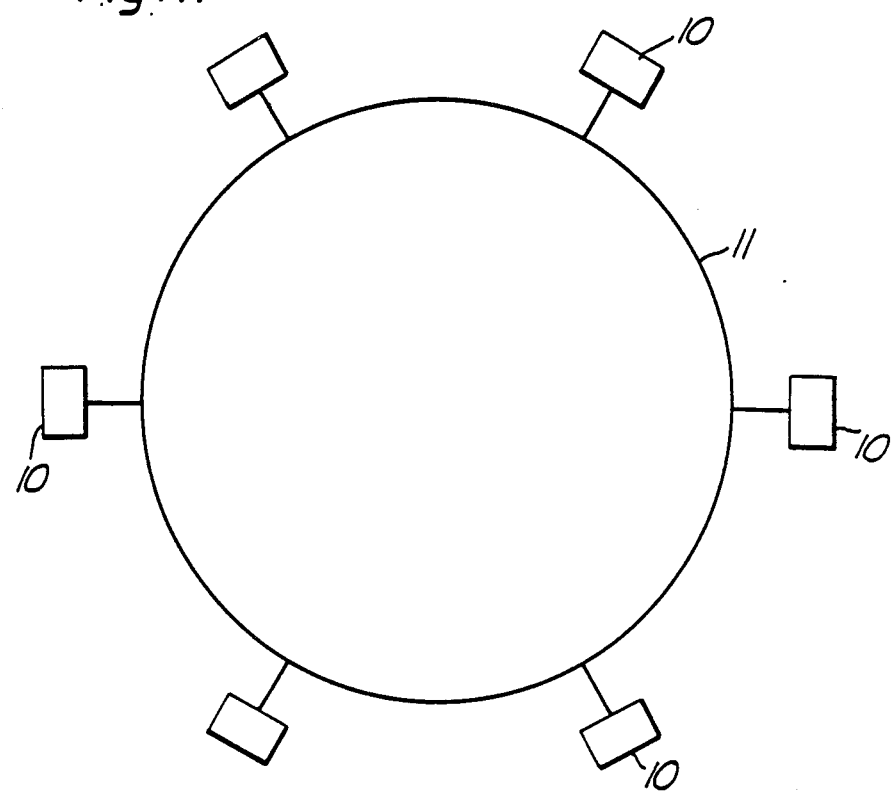
FIG. 1 is a schematic diagram illustrating a communications network in accrodance with an embodiment of the present invention.

Referring to FIG. 1 of the drawings, a communications network system comprises a plurality of stations 10 which can communicate via a transmission ring or loop 11. The stations 10 can incorporate many forms of digital based devices such as data processing equipment, video devices, facsimile or telephone equipment and each station may concentrate traffic from several devices. Also one station could for example provide access to the public switched telephone network. The loop is designed to operate according to what is known as a slotted ring protocol. In this type of arrangement one or more slots or blocks each of which comprises a predetermined number of bits circulates around the ring and can be seized by a station which wishes to transmit data to another station. The ring carries a fixed integer number of equal length slots which are established at switch-on and maintained continuously by a station which acts as monitor. In case of failure of the monitor station, another station can take over the monitor function.

In the present arrangement when a station wishes to transmit data to another station it is permitted to seize up to a total of d empty slots (which need not be successive slots) and when it has used that number d it is automatically placed in a state, known as a pause state, in which it is not permitted to seize further slots. That station is not allowed to seize further slots until it is reset to an active state. If other stations are waiting to transmit data the original station cannot be reset to an active state until those further stations have had an opportunity of using up their allocation of empty slots. The way in which this is achieved will become apparent from the following description.

Figure 2:
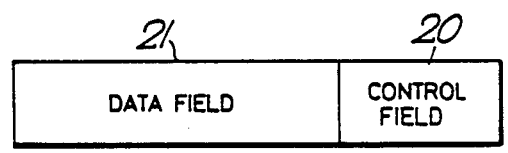
FIG. 2 shows the structure of a slot of the network of FIG. 1.

Referring to FIG. 2 of the drawings each slot comprises two sections each made up of a number of bits. Section 20 is a control field 20 and the second section 21 comprises the data bits which carry the information to be transmitted to another station. The control field 20 has a number of bits in which bit 1 is a full/empty bit, bit 2 is a trial bit, bit 3 is a monitor bit, bit 4 is a priority indication bit, bit 5 is a broadcast bit and bits 6 and above define a code representing the destination address (DA). The destination address defines only the station to which the information carried in the data field is directed. Additional addressing to route that information to the appropriate location within the station is contained within the data field 21.

In operation when a station wishes to transmit data to another station it identifies an empty slot circulating on the ring 11, renders the bit 1 to a condition indicating a full slot and inserts the appropriate destination address DA into bits 6 onwards. The data to be transmitted is inserted into the data field 21. The slot then travels around the ring and the destination station recognizes the destination address and accepts the data in the data field. The slot is emptied at the destination station, the bit 1 is returned to its condition indicating an empty slot and that empty slot is then passed on to the next adjacent station which can make use of the slot if it has data to transmit.

Any station which has been rendered active may seize up to d empty slots. Once the threshold value d has been reached, which is sensed by a counter at the station, the station enters a pause of inhibited state in which it cannot seize any further slots even though it may have further data to transmit. The station remains in that pause state until it is reset to an active state as will be described below. It will be appreciated that subject to the d threshold restriction an active station can have several slots on the ring at any time. During a pause state the station can continue to receive data slots from other stations but cannot transmit data.

When a station is in an idle state or in a pause state it permanently carries out a function even though it is not transmitting data. This action is as follows. Provided that station is not marked as having been set to an outstanding reset condition, which will become apparent later, then whenever it identifies a passing empty slot whose trial bit (bit 2 of the control field) is off it turns that trial bit on in that slot, loads its own address into the DA bits and sets itself as having an outstanding trail. The full/empty bit of the slot is not set so the slot is available to other stations for transmission. If any station subsequently senses an empty slot in which the DA bits match its own address and in which the trial bit is on it responds as follows depending upon the outstanding trial condition. If the station has an outstanding trial indicated, the full/empty bit (bit 1 of the control field) of the slot is converted to a full condition. That station then reverts to an active or idle state according to whether or not a packet is waiting, set its d counter to zero and loads into a d threshold store the next d threshold value. Finally it cancels the outstanding trail indication and marks itself as having an outstanding reset. If an outstanding trail is not indicated then the trial bit of the slot is turned off and the DA bits are all made zero.

A station which senses a slot whose full/empty bit is on and whose trial bit is on also responds as follows depending upon its outstanding reset condition. If it does not have an outstanding reset the station reverts to an active or idle state, zeros its d counter and loads into its threshold store the next d threshold value. Finally it cancels any outstanding trail marking. If an outstanding reset is indicated then the trial bit of the slot is turned off together with the full/empty bit and the DA bits are made zero. Finally the outstanding reset indication is cancelled.

Thus, it will be seen that a station which wishes to transmit data can, when it is made active, use up to d slots before having to pause from the transmission of data. It is then not allowed to seize further empty slots. However, the station can set a trail bit in an empty slot in order to test whether any other station on the ring is waiting to transmit. If there is such a station waiting then that station will seize the empty slot and delete the trial bit which was set by the original station and then that further station will have an opportunity of transmitting its allocated number of d slots. When it has transmitted its allocated number it will also test the ring. This procedure carries on until a stage is reched where there are no more stations waiting to transmit and an empty slot with its trail bit set will return to the originating station and this originating station responds by setting the full/empty bit (bit 1) to indicate a full condition, and transmitting the slot. All stations then respond to this combination of a slot marked as full and with its trial bit on and their d allocations are reset. This is known as resetting or refreshing the ring. It should be noted that the time between the first node reaching a pause state and the ring being refreshed is usually short in comparison with the time between each refresh.

It will be appreciated tht the d values can be chosen to provide each station with the bandwidth which it requires. If it is assumed that each station has the same d value then the instantaneous demand for bandwidth will vary from station to station being higher for example at stations with video transmissions. Some stations may therefore use their d allocation much quicker than others. The protocol described above ensures that the first station to use its allocation of d slots pauses momentarily thereby giving other stations the opportunity to transmit any data that has accumulated before the ring is refreshed and the high demand station can continue. In this way stations are guaranteed an equal share of the available bandwidth if required. A ring with fully loaded stations will share its bandwidth equally with a minimum guaranteed bandwidth being available at any station. This is an important feature of the present arrangement.

In practice it can be shown that delays are minimized if the minimum guaranteed bandwidth for each station is closely matched to its requirements. This can be achieved by allowing the d value of a station to be selected to correspond with its expected demand. Thus, for example, a station can be given as a minimum bandwidth the equivalent of one data channel in addition to which it can claim extra bandwidth for telephony and video. Consider a station which is using a single video channel of 32 slots in a repetition period which is not more than 2 msec. The internal counter of the station is set so that it can tell when 32 slots have been transmitted following which it enters the pause condition and thus allows other stations to transmit until it is reset. If the ring is lightly loaded refreshing will occur after a few ring rotations and stations will then be able to seize extra bandwidth. It can be determined that the refresh period shall not be longer than 2 msec so that each station examines the refresh period and if it is close to 2 msec such that there would not be sufficient empty slots for a node to seize 32 slots to make an additional video call (and leave a minimum of empty slots so that there was not in fact 100% utilization of ring) then a node would not be able to transmit this additional load and that would be blocked. All stations are able to determine for themselves whether the refresh period is too close to 2 msec for them to seize extra bandwidth.

The control of the d value is carried out using a d threshold store at each station which holds two stored values of d. One value, representing the current d allocation, is the reference value controlling entry into the pause state. The other is the "next d threshold", which replaces the reference value on every reset. Both read and write access is provided on "next d threshold" allowing a separate load control module to control the value of d using a higher level protocol remote from the ring protocol. This is described in more detail below with reference to FIG. 3. If the maximum allowable reset interval is increased, the load control module can then increase the value of d accordingly. In effect the protocol provides a guaranteed bandwidth for established calls.

The details of the control of the next d threshold are as follows. First, the next d threshold is initialized with some suitable small value, e.g., next d threshold equals 2. The purpose of this is to allow stations to support the low speed data service and signalling requests. The value of 2 would imply that as the time between successive resets approaches 2 msec the data service would still be 128 kbits/sec available at each station assuming a 128 bit slot information field. The fixed service is referred to as the background service.

When further low-speed data connections are set up on the ring the threshold d is not increased above the background value of 2. If there are no real-time services, the N stations will be able to supply 2N slots (assuming a background of 2 for all stations) before all stations reach their pause states and a reset occurs. Hence a ring loaded only by data connections has short reset intervals, although the ring may be fully loaded, and each station obtains a high bandwidth. The load of real-time calls on the ring can be built up in a controlled way as follows. When a new call set up request is made (speech, video or fast file transfer) the current average reset time is examined. If this indicates that there are sufficient empty slots within the 2 msec period to support the new service then the new call request is permitted. The next d threshold is then updated by an amount suitable for the additional connection (e.g., 2Mbit/sec video would require an additional 32 so the next d threshold would then be 32 plus background). As real-time calls are established, therefore, the effect is to reduce the bandwidth available to lowspeed data calls. Similarly, on termination of a call the next d threshold is decremented accordingly. In fact additional thresholds can be set for the average reset interval and for each service time so that a service request is blocked if the current average reset interval is above the appropriate threshold.

The maximum allowable period between resets is determined according to the requirements of real-time service on the network. For speech calls not on the public network, maximum allowable delays are around 2 msec. If no other real-time service (such as video) has more stringent delay requirements, then 2 msec is taken as the maximum delay interval.

If for some reason the average reset time becomes longer than 2 msec the background service may be temporarily inhibited (e.g., by decreasing the next d threshold by an amount equal to the background value).

Restoration of the background occurs as follows. Whenever the latest reset time drops below some suitable threshold (less than 2 msec) the background is added. This carries on until the full background is returned. In this way the reset times can be controlled to permit services which are sensitive to packet loss.

It will be observed that once a call has been set up and bandwidth allocated for it, that call will be able to continue until it is terminated by the called or calling party (unless there is node failure, for example). This is in contrast to conventional ring systems such as the Cambridge ring where overloads result in buffer overflows, with consequent packet loss, or the slowing down of attached devices; this is not acceptable for real-time services, where overloads should result in unsuccessful call attempts rather than degredation or premature release of calls in progress.

Figure 3:
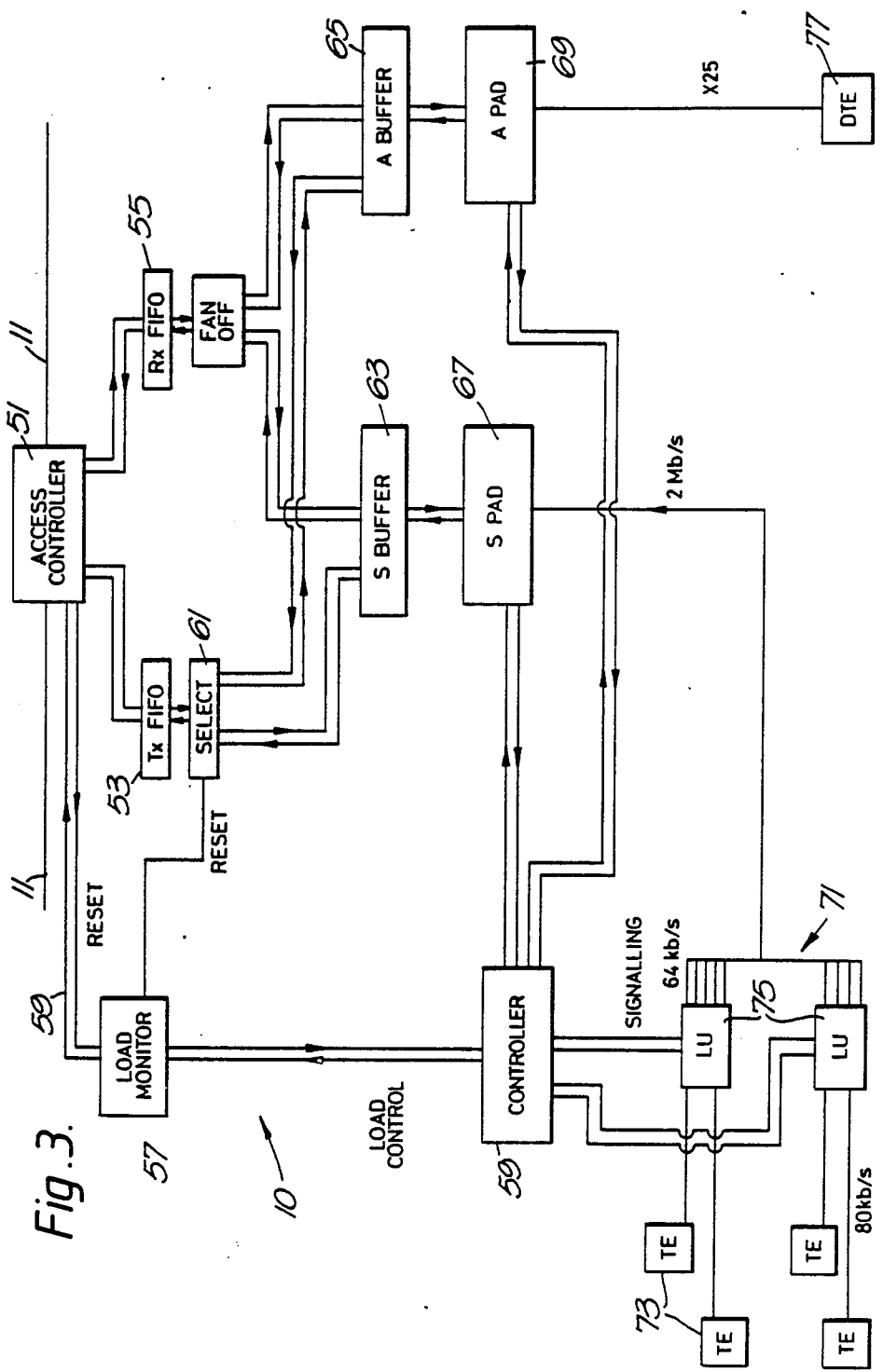
FIG. 3 is a schematic diagram illustrating one example of a station on the network of FIG. 1.
Figure 4:
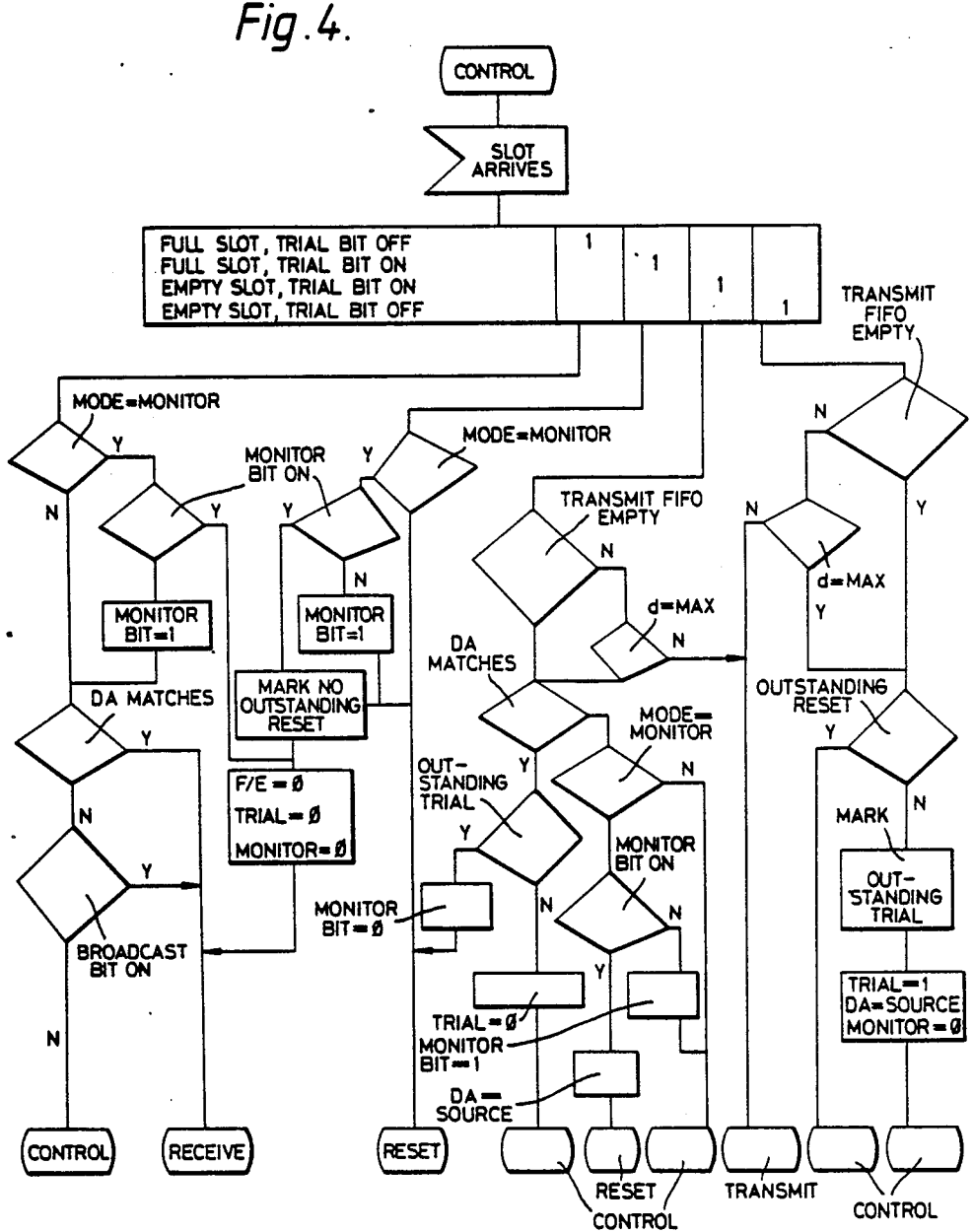
FIG. 4 to 7 are flow diagrams of various functions carried out at a station of the network of FIG. 1.
Figure 5:
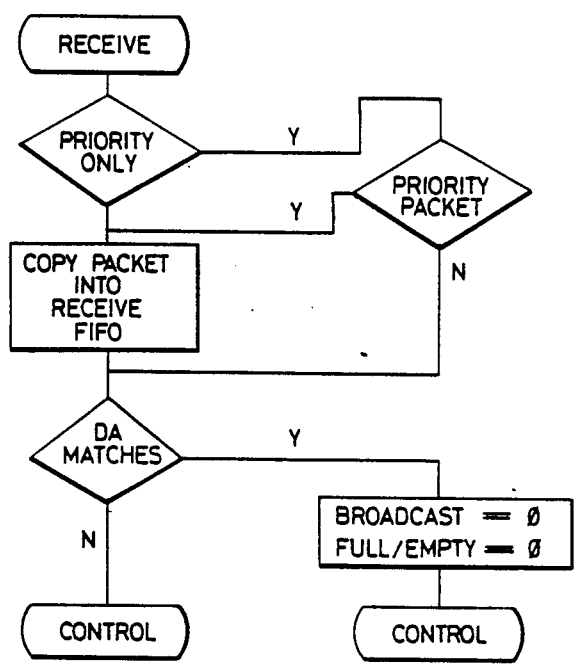
Figure 6:
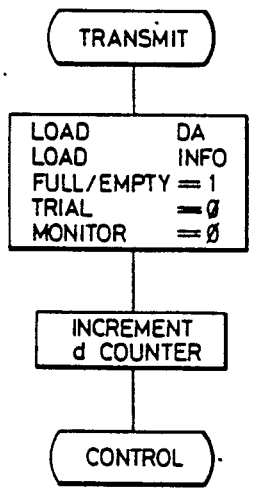
Figure 7:
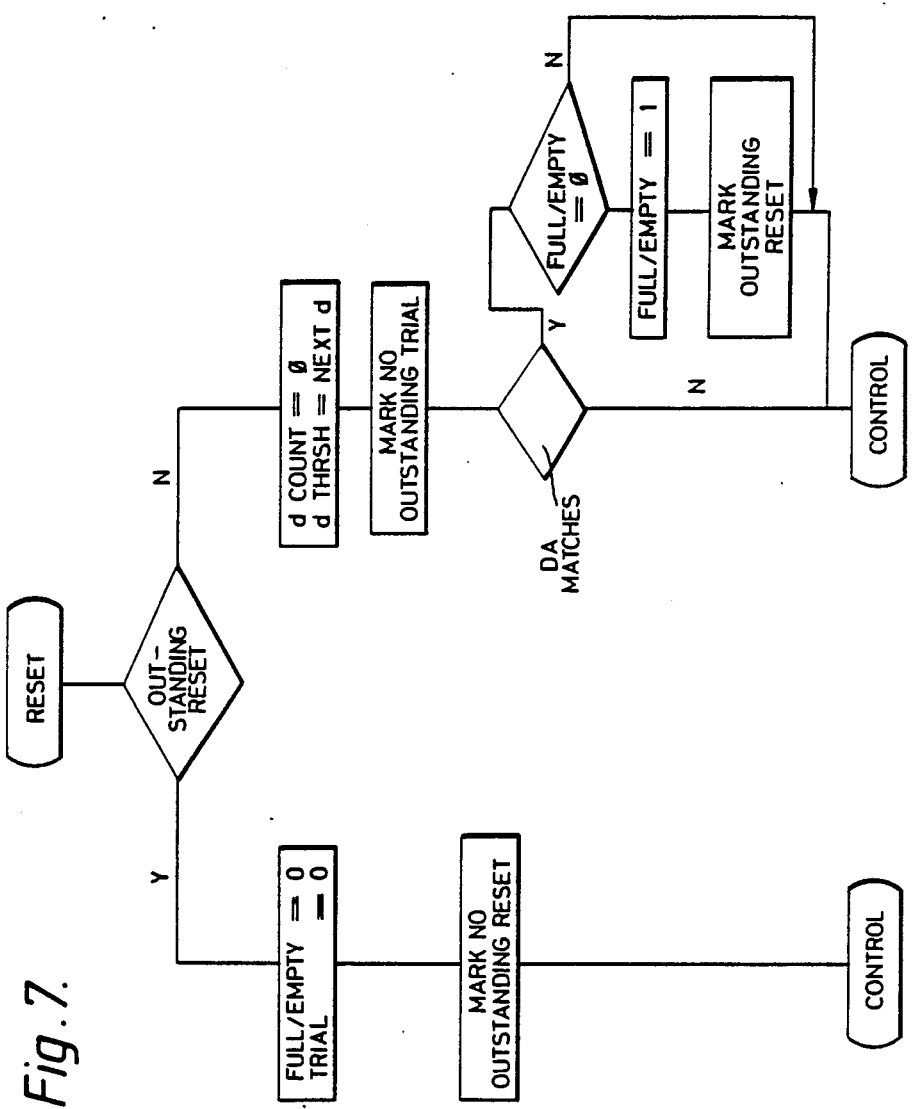

Referring to FIG. 3, this shows a possible design of a station 10. The station comprises access controller 51 which operates the protocol described above. Controller 51 comprises a reference store holding the two stored values of d for the station and provides for transmission of slots onto the ring 11 from transmit buffer 53. It also provides for reception of slots from the ring into receive buffer 55. Updates to "next d threshold" are received from load monitor 57. A pulse is sent to load monitor 57 on each reset. The load monitor counts how many reset signal pulses are received per maximum allowble reset interval, say 2 msec. Information on reset rate is also transmitted to controller 59 which receives call set-up requests in the normal way from attached devices. A new call requiring to send M slots per 2 msec interval can be accepted if the number of resets P per 2 msec is greater than or equal to M/L where L is the number of slots on the ring. If the reset interval rises above 2 msec, the load monitor 57 may reduce the threshold d by the background allocation.

On indication from the transmit buffer 53 that a further slot can be accepted, select poller 61 polls sychronous and asynchronous buffers 63 and 65 containing ready-assembled slots to see which waiting slot has higher priority, and this slot is transmitted to the transmit buffer 53 for onward transmission to the ring 11. The rate of acceptance of low priority slots is controlled by the ring reset rate as will now be explained. On each reset, a reset signal is sent to the poller 61. This resets a counter within the poller which enables the acceptance of low priority packets until the counter senses that the background allocation has been transmitted. Entry of low priority packets into the transmit buffer 53 then proceeds whenever the transmit buffer 53 indicates that a further packet can be accepted and provided that no higher priority packet is waiting. Thus the rate of entry of low priority slots into buffer 53 is controlled by the rate of reception of reset signals by poller 61, and the correct mix of low and high priority packets is supplied to buffer 53 by poller 61. Load monitor 57 may inhibit the supply of reset pulses to pollar 61 if the reset interval increases above the 2 msec maximum.

Slots for buffes 63 and 65 are provided from synchronous packet assembler/disassembler (SPAD) 67 and asynchronous packet assembler/disassembler (APAD) 69, respectively. SPAD 67 creates slot-sized packets from time division multiplexer (TDM) equipment 71, comprising terminating equipment (eg telephones) 73 and line units 75 which send signalling information to controller 59. On each call set up an appropriate header is set up by controller 59 and supplied to SPAD 67 for use on all slots for that call ALL SPAD slots have high priority and are stored in buffer 63.

The maximum allowable period between resets is determined according to the requirements of real-time services on the network. For speech calls not on the public network, maximum allowable delays are around 2 msec. If no other real-time service (such as video) has a more stringent delay requirement, then 2 msec is taken as the maximum delay interval.

APAD 69 creates slot-sized packets from an arriving data packet stream from data terminating equipment 77 and generates and verifies a frame check sequence. Normally, data slots have low priority. If a particular data connection requires guranteed bandwidth, signals are sent to controller 59 and load monitor 57 to increase the value of d in access controller 51. In this case, the corresponding slots are marked for high priority.

FIGS. 4, 5, 6 and 7, respectively, are flow diagrams summarising the control, receive, transmit and reset functions carried out by access controller 51.

The ring network described above may be used as a local area network (LAN) where the length of the ring is typically a few kilometers, and around 20 to 30 stations on the ring communicate with workstations, computers, VDUs, telephones etc. around the office block or site served by the LAN. Alternatively the ring may be much samller (although the number of stations may be similar) and, together with other similar rings, form part of a high speed switch for speech, data etc. For public switching, the maximum interval between resets would need to be smaller than the figure of 2 msecs quoted above for a LAN. To meet CCITT requirements, resets would need to occur at least every 125 microseconds.

Each station, as shown in FIG. 3, is provided with slots from different sources, for example speech slots from equipment 71 and data slots from equipment 77. In a switch, slots of different types from one ring need transferring to another.

Figure 8:
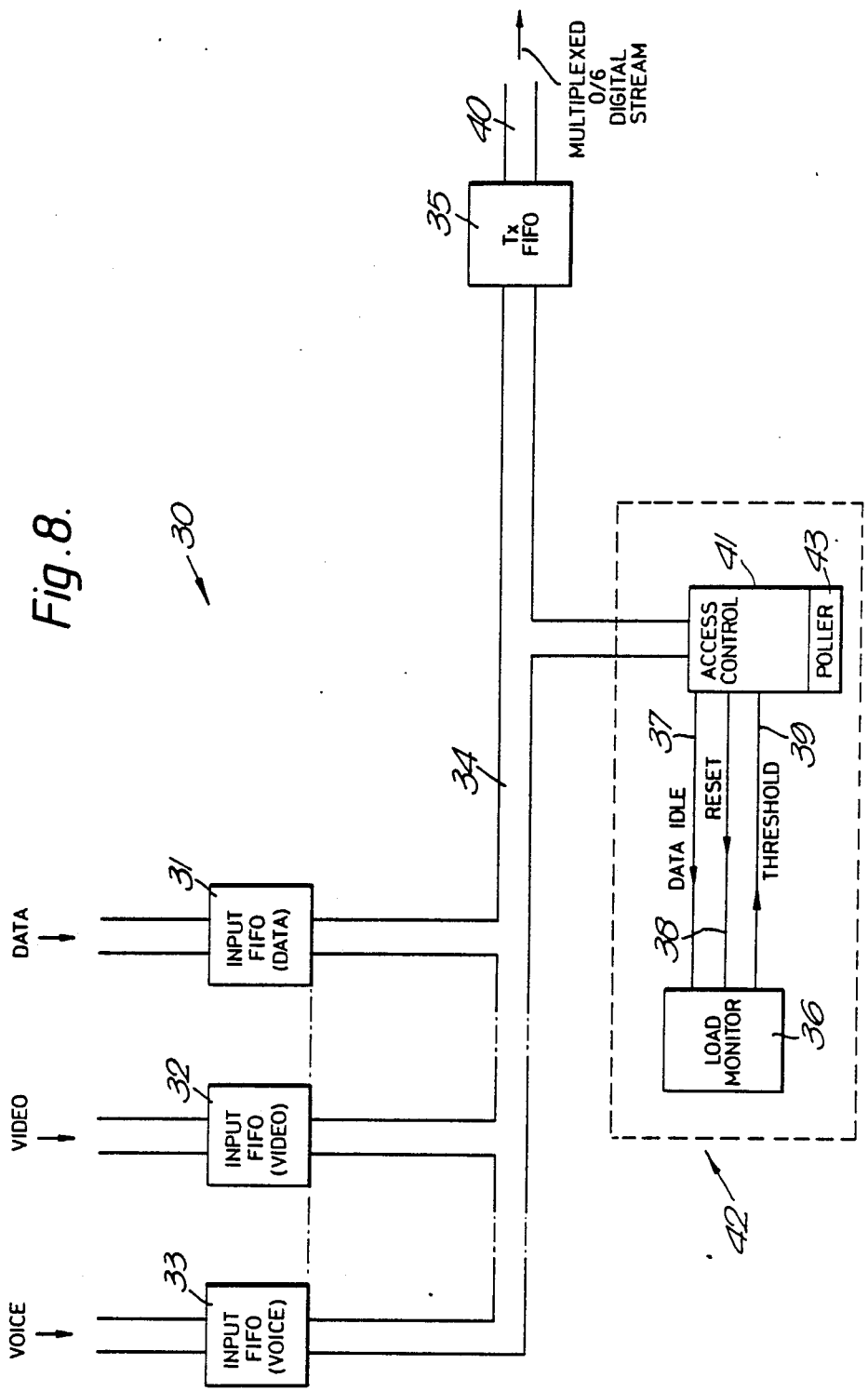
FIG. 8 is a schematic diagram illustrating an embodiment of a communications multiplexer in accordance with the invention.

FIG. 8 shows a multiplexer suitable for multiplexing slots from several buffers containing queues of slots, onto a communications link. The multiplexer uses essentially the same protocol as the ring described above. This is advantageous because it enables slots to be transmitted over the whole network system without having to use gateways to rebuild slots to meet different requirements for different parts of the system. Overheads in moving from ring to link are therefore avoided.

Figure 9:
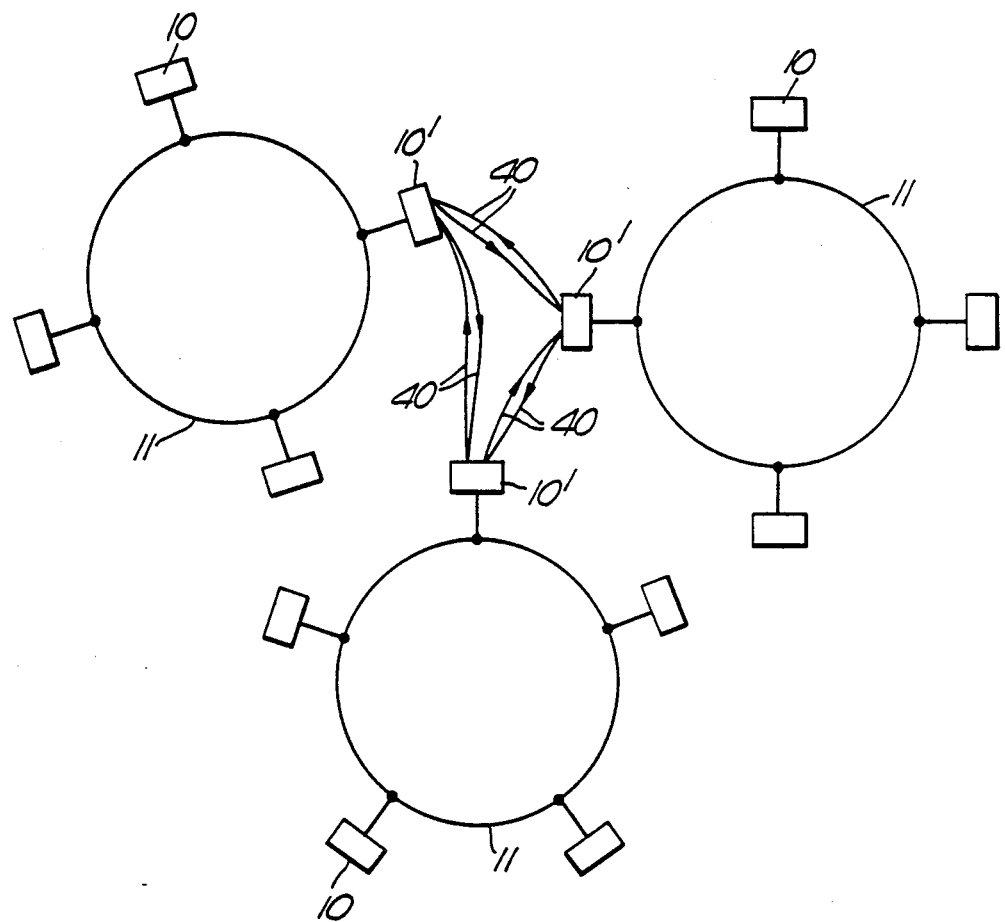
FIG. 9 is a diagram shownning a network of rings and links.

Multiplexer 30 comprises a number of input first in - first out (FIFO) buffers comprising queues of fixed length blocks or slots awaiting transmission onto a link 40. Three queues 31, 32 and 33 are shown in FIG. 8 out of a total of, for example, six or seven queues. The embodiment of multiplexer 30 described below is adapted to use a protocol very similar to that of the slotted ring network described above with reference to FIG. 1. The differences between the protocols arise beause the link multiplexer has a centralized controller, whereas the stations on the ring are independently controlled. The controller of the link multiplexer knows the status of all its queues and can generate reset signals at appropriate intervals. Stations on the ring in pause states have to carry out trails to find when a reset can occur. A number of rings 11 used for switching or as LANS may be interconnected by multiplexers 30 as shown in FIG. 9.

As shown in FIG. 8, queues 31, 32 and 33 communicate via a common data and control bus 34 with a transmit FIFO buffer 35, which transmits slots from the queues onto communications link 40.

A queue is provided for each type of service requiring access to link 40. Queue 31 comprises data slots, for which access to the link is not time critical. Other services reequire access to the link within set periods, according to the nature of the service. Speech, for example, may need to send one slot of 160 bits, having a 128 bit information field, every 12 milliseconds to satisfy error and grade of serice specifications. Voice slots and any other service needing to send a slot every 2 milliseconds are provided with a queue 33. Queue 32 is for low variable bit rate (VBR) video slots. Further queues (not shown) are provided for further synchronous fixed and variable bit rate services having different delay limits. Each queue has a designated priority. In this example, queue 33 (voice) has the highest priority and queue 31 (data) the lowest priority. Priority is determined by position, the highest priority queue being on the left and the lowest on the right. Alternatively queue priority could be stored in a register.

The multiplexer has a controller 42 which communicates with bus 34 and comprises access controller 41 and load monitor 36. Access controller 41 includes a polling mechanism 43 which polls the queues in priority order to see if they have a slot to transmit. The polling mechanism also includes a counter (not shown) for each queue and a reference store consisting of a read and write memory (not shown) which stores the current threshold, or allocation of slots, for each queue and also a "next threshold" value. Load monitor 36 communicates with the access controller 41 and receives from controller 41 data idle signals on line 37 and reset signals on line 38. Load monitor 36 also outputs threshold signals to controller 41 on line 39. Using these signals, the load monitor 36 in conjunction with access controller 41 serves to vary dynamically the bandwidth allocated to each of queues 31, 32, and 33, and thus guarantee a minimum bandwidth allocation to each queue.

In operation, queues 31, 32, and 33 are supplied with constant length message slots requiring transmission to the outgoing link 40.

As described above for a slotted ring, each queue is allowed to transmit a number, d, of slots, and when a queue has transmitted its allocation of d slots, it is inhibited from transmitting further slots until the counter associated with that queue has been reset. A reset occurs only after all queues have had the opportunity of transmitting their full allocation of slots. Some queues may be empty, or become empty, before their full allocation of d slots has been transmitted onto link 40; these, however, together with queues which have transmitted their d allocation, will have their counters reset as soon as no queue can be transmitted any further slot. Of course, unlike the slotted ring, all slots queuing are full slots and no writing in the control field is necessary: slots are transmitted onto the link without any bits being altered. Each queue may have a different value for d, and the value of d for each queue can be varied.

The operation of the multiplexer will now be described in greater detail.

The transmit buffer 35 needs to be supplied with slots from queues 31, 32 and 33 at the rate at which it can unload slots onto link 40. Polling mechanism 43 carries out the following sequence in order to transmit slots to buffer 35 at the required rate. The sequence is initiated on detection by poller 43 of an input ready signal (logic 1) on the transmit buffer 35. The poller 43 checks the highest priority queue (queue 33) for an output ready signal and also checks the status register to see if the queue is inhibited from sending further slots (i.e., if it is in a "pause" state—which has logic 0). If the queue 33 has a slot to transmit and it is not inhibited (both logic 1 states), and output enables is put on its buffer and the slot is put onto bus 34 and delivered to buffer 35 for transmission onto link 40. The counter in access controller 41 associated with queue 33 is incremented by one. When the poller 43 next detects an input ready signal on the output buffer 35, this procedure is repeated. Once the full allocation of d slots for queue 33 has been transmitted to link 40, the counter for that queue contains the value d, the status register for queue 33 marks that queue as inhibited and the queue 33 enters the "pause" state. In this state, queue 33 is prevented from transmitting further slots until its counter is reset. Poller 43 now fails to detect two logic 1 states for queue 33 and moves to the queue to the right (not shown) which has the next highest priority. If that queue has no slots to transmit, the next queue to the right, say queue 32, is polled and a waiting slot is transmitted onto line 40. If, during transmission of that slot a new slot arrives at the higher priority queue to the left (previously empty), that slot will be the next to be transmitted as the poller always returns to the highest priority queue when an input ready signal is detected on buffer 35. The system therefore progresses towards a situation in which all queues are either in a pause (i.e., inhibited) state or an idle state in which no slots are waiting for transmission.

When the polling mechanism finds that no slots can be selected it causes a reset of all the queue counters and at the same time it sends a reset pulse to load monitor 36 via reset line 38. Load monitor 36 keeps a count of the number of reset pulses received in a given time interval. Each occurrence of a reset corresponds to a slot on outgoing link 40 remaining unused, and the frequency of resets determines the spare capacity which is available on link 40. The load monitor 36 uses the rate of resets to determine call acceptance for synchronous time-critical services such as speech as described below.

The value of threshold d for each queue is the maximum number of slots that the queue can transmit onto link 40 between resets. Thus the maximum time between resets is the time for the full allocation of slots to be transmitted from all queues. To meet the stringent time constraints placed on synchronous services such as 64 kbit/sec speech, it is necessary for delays between consecutive slots associated with a particular call (each ahving a 128 bit information field) to be less than, for example, 2 msecs. The maximum time between resets must be selected according to the delay limit of the queue having the most stringent time constraints. If one queue must send a slot every 62.5 microseconds and other queues have maximum delays of 2 milliseconds or more, 62.5 microseconds is taken as the maximum allowble interval between resets. Suppose, for example, that queue 33 is servicing 64 established 64 kbit/sec speech calls, each needing to offer 1 slot every 2 msecs, and the maximum allowable interval between resets is 62.5 microseconds. In this case, the threshold for queue 33 needs to be 2 in order to handle the calls without unacceptable delays. There is thus a guaranteed minimum acceptance rate of 64 slots per 2 msec interval, and queue 33 is guaranteed the necessary bandwidth to service its calls. Load monitor 36 is used to monitor synchronous services and to make dynamic adjustments to the thresholds for queues of synchronous services to match the number of calls in progress whilst maintaining the reset interval below the maximum allowable. The former of these is implemented via line 39 between the load monitor 36 and the polling mechanism in access controller 41. There are two stored values of each queue threshold maintained by the poller 43 in its reference store. One value, representing the current bandwidth allocation (d) for the queue, is the reference value controlling entry into the pause state for the current reset interval. The other value, known as next threshold, is loaded in place of the existing value, as the new bandwidth allocation (d), on every reset. Both read and write access is permitted for load monitor 36 on next threshold. When a new connection for queue 33 is set up, the number of message slots which the new call will require to send within a given service delay limit is sent to the load monitor 36. In the above example, the message slot has an information field of 128 bits, and a new 64 kbit/s voice call will require to send one slot within each 2 millisecond period which, for efficiency reasons, is chosen as the service delay limit. The load monitor 36 adjusts the threshold to maintain the correct guaranteed call acceptance rate. Thus, if the maximum allowable reset interval is 62.5 microseconds. the threshold would need to be incremented by one for each additional 32 64 kbit/s voice connections established on link 40.

Before adjusting the threshold, load monitor 36 must check that acceptance of the new voice connections will not increase the reset interval above the maximum allowable reset interval. A connection for a new call for queue 33 will only be established if the frequency of resets exceeds the guaranteed minimum. For example, given a maximum allowable reset interval of 62.5 microseconds, the target minimum number of resets in any 2 millisecond period is 32. Hence a new 64 kbit/sec voice connection offering one slot every 2 milliseconds can only be established if there are curretnly at least 33 resets per 2 milliseconds.

It will be appreciated that queues are set up according to the nature of the services using the multiplexer. For example, synchronous constant bit rate (SBR) services requiring a maximum link access delay of 125 microseconds will be assigned to one queue and SBR services with a maximum delay limit of 2 milliseconds to another. Additional queues may be provided for further SBR services and dynamically varying bit rate (VBR) services with different average maximum delay intervals. Normally only one queue need be provided for data.

The link multiplexer of FIG. 8, unlike the ring of FIG. 1, has a centralised controller 42, (comprising load monitor 36 and access controller 38). Control by load monitor 36 is restricted to delay critical synchronous services. For data queue 31, there is a fixed threshold. This is chosen to be a small value, eg 1, in order to ensure some acceptable minimum bandwidth on link 40 even when resets are spread apart at the target maximum interval. However, when link 40 is loaded mainly or entirely by data, resets will be very frequent. Hence a high bandwidth is obtained by data queue 31 when few time-sensitive services are connected to the multiplexer.

In the situation where synchronous connections are established on link 40 previously loaded only by data message slots, the reset count will initially be high even though link 40 may have been fully loaded. This high reset count indicates that more time critical calls can be accepted and the threshold for queue 33 increased. Hence set up of speech calls proceeds and the threshold for their queue 33 is suitably increased. This reduces the reset count which means that data queue 31 rceives a smaller bandwidth allowance. Thus a dynamically adjusted boundary is provided for allocation of bandwidth on link 40 for synchronous and asynchronous use.

In order to provude an estimate of spare data capacity, the polling mechanism in the access controller 30 supplies a pulse via line 37 to the load monitor 36 for each idle reset of data queue 31 (i.e. a reset which occurred when the data threshold had not been reached). Thus, if a two millisecond period contained, for example, 10 idle resets this would indicate that a new data connection could be established which required to send a maximum of 10 slots every two milliseconds. However this maximum is not guaranteed; the main purpose of the count is to prevent unnecesary loading of data queue 31 by new connections when existing capacity is fully utilised.

To establish a variable bit rate (VBR) connection, the threshold for queue 32 is updated. Load monitor 36 adjusts the threshold increment for an estimated mean rate of transmission of the connection. Video services are subject to time constraints in the same way as speech servies; however in order to keep costs down for video customers, high grade video channels are only made available to customers when the system is lightly loaded. This is achieved by setting the threshold (d) for queue 32 lower than the maximum bandwidth. Most of the time, the frequency of resets will be much faster than the minimum frequency and the video queue will be able to put the necessary numbe rof slots onto link 40. If, however, the other queues become busy and the time between resets approaches the maximum, only a minimum bandwidth is available to the video customer. Permission to establish a new VBR connection will use the current reset count just as for synchronous fixed bit rate connections such as voice calls.

In addition to methods for restricting the load to preserve a bounded reset interval, the polling mechanism registers an overload condition if it is unable to perform a reset within the maximum interval. At this point it immediately causes all queue counters to be reset thereby allowing high priority queues to resume service.

Output buffer 35 is responsible for sending a frame alignment slot at regular intervals to enable a distant receiver on link 40 to be synchronised to the outgoing message slot stream. Output buffer 40 also incorporates a register to provide link 40 with a dummy full slot to be put on the link whenever no slot is received from any of the queues 31, 32 and 33, i.e., whenever no slot can be selected from the queues and a reset is taking place FIG. 9 shows three rings 11, used for switching purposes, interconnected by links 40. Each ring has a station 10', providing access to links 40. Stations 10' are the same as stations 10 shown in FIG. 3 except they also include buffers for queues of slots (31, 32, 33 etc). a transmit buffer 35, and a controller 42 for each link 40 terminating at each station 10'.

I claim:

1. A method for carrying encoded delay sensitive and non-delay sensitive messages in a communications system having a communications link and a plurality of locations each including means for storing information to be carried in message blocks on the link; said method comprising the steps of:

providing at each location an allocation of d blocks, where each location may have a different value for d and where d is an integer greater than zero, determining whether the allocation of d blocks has been transmitted from a location, allowing a location to transmit one block onto the link whenever a block is waiting at that location and an empty slot is received at that location if said allocation of d blocks has not been transmitted, irrespective of its time relationship to earlier empty slots utilized by that location and irrespective of whether another location is currently transmitting onto the link, denying entitlement of a location to transmit further blocks until a further allocation is received after d blocks have been transmitted onto the link from the location, wherein said further allocation is received following a test of all locations for loss of entitlement to transmit and wherein none of said plurality of locations is in a preferential position with regard to the interval of time between successive allocations.

2. A method as claimed in claim 1, further including the step of setting a maximum allowable interval for receipt of a further allocation according to delay requirements for delay sensitive message blocks.

3. A method as claimed in claim 2, including counting the blocks in a counter for each location and resetting the counters when every location is inhibited or empty.

4. A method as claimed in claim 3, wherein prior to accepting a new delay sensitive call, the interval between resets is compared with the maximum allowable interval between resets to determine whether the call can be accepted without the reset interval rising above the maximum allowable interval, and on acceptance of the call, increasing the allocation d for its location.

5. A method as claimed in claim 1 including multiplexing message blocks stored in queues at said locations onto said link, and allocation d blocks to each queue.

6. A method as claimed in claim 1, wherein said link comprises a ring and stations are provided at said locations, said method further including utilizing a controller at each station to give the allocation of d blocks to its associated station.

7. A method as claimed in claim 1, including allowing each location to have a different allocation d of blocks, the allocation for a particular location being variable dependent on message load conditions.

8. A method of controlling communications between stations in a communications network having a plurality of stations which can communicate via a ring; said method comprising the steps of:

providing information in digital form for transmission from one station to another in message slots which circulate around the ring, each message slot being provided as a first group of control bits and a second group of data bits, each station when it requires to transmit assuming an active state in which it inserts digitally encoded information into empty slots for transmission to a destination station via the ring, determining whether a station has transmitted information into d slots, where d is an integer greater than zero and where each station may have a different value for d, allowing a station to transmit information into an empty slot onto the ring to said destination station provided that d slots have not already been transmitted from said station irrespective of the time relationship of the empty slot to earlier empty slots utilized by that station and irrespective of whether another is currently transmitting onto the ring, controlling said station, after it has inserted information into d slots to enter a state in which it cannot gain access to empty slots for the transmission of information until it is reset in response to recognition of an empty slot having travelled at least once around the ring, said resets being issued to each of said stations so that no station is in a preferential position with regard to the rate of reception of resets.

9. A method as claimed in claim 8, further including the step of providing a bit among the control bits of each slot which when that slot is empty can be set to a particular state by an inhibited station.

10. A method as claimed in claim 9, further including the step of setting via each station which senses an empty slot having a control bit which is so set, a further control bit, a slot which has two control bits so set operating to carry out said resetting of stations.

11. A method as claimed in claim 8, including controlling the value for d, at each station for determining whether an increase in insertion rate of data information can be accommodated, said controlling step being responsive to the interval between resets to increase the value of d provided this interval is less than a predetermined value.

12. A method of multiplexing message slots onto a communications link, said method comprising the steps of:

providing a plurality of queues for message blocks to be transmitted onto the communications link and controlling the queues to give an allocation of d blocks to each queue, where d is an integer greater than zero and where each queue may have a different value for d, determining whether d blocks have been transmitted on the link from a queue, deciding which block should be selected for transmission onto the link if blocks are waiting in two or more queues which have not exhausted their d allocations, allowing a queue to transmit a block onto the communication link, provided that d blocks have not already been transmitted from said queue, the selected block being chosen irrespective of its time relationship to other blocks transmitted onto the link from the same queue, and wherein if d blocks are transmitted onto the link from a queue, that queue is inhibited from transmitting further blocks until a further allocation is received.

13. A method as claimed in claim 12, wherein the controlling step includes counting slots for each queue in a counter and resetting the counters when every queue is inhibited or empty.

14. A method as claimed in claim 13, further including the step of setting a maximum allowable interval between resets according to delay requirements for message blocks with time sensitive services.

15. A method as claimed in claim 14, providing respective queues for time sensitive services having different maximum delay intervals, and wherein the maximum allowable interval between resets is no greater than the maximum delay interval for the queue having the smallest such interval.

16. A method as claimed in claim 14, further including using, prior to accepting a new time-sensitive service call, the number of resets per maximum allowable interval between resets to determine whether the call can be accepted without the reset interval rising above the maximum, and on acceptance of the call, increasing the allocation d for its queue.

17. A method as claimed in claim 12, wherein each queue has an assigned priority and the controlling step includes the step of polling the queues in priority order.

18. A method as claimed in claim 12, providing a queue for non-time sensitive services, said queue having a small, fixed allocation d.

19. A communications system for carrying encoded delay sensitive and non-delay sensitive messages comprising:
   a communications link and a plurality of locations each including means for storing information to be carried in message blocks on the link;
   means for providing a plurality of message slots for transmission in the link;
   means for allocating d blocks to each location, where d is an integer greater than zero and where each location may have a different value for d;
   means for determining whether the allocation of d blocks have been transmitted from a location;
   means for allowing each location to transmit one block onto the link whenever a block is waiting at that location provided that d blocks have not already been transmitted from said location and an available empty slot is received at that location irrespective of its time relationship to earlier empty slots utilized by that location and irrespective of whether another location is currently transmitting on the link; and
   means for denying entitlement of a location to transmit further blocks until a further allocation is received after d blocks have been transmitted onto the link from the location, wherein said further allocation is received following a test of all locations for loss of entitlement to transmit and wherein none of said locations is in a preferential position with regard to the interval of time between successive allocations.

20. A system as claimed in claim 19, further including means for setting a maximum allowable interval for receipt of a further allocation according to delay requirements for delay sensitive message blocks.

21. A system as claimed in claim 20, including a counter for each location and wherein the counters are reset when every location is inhibited or empty.

22. A system as claimed in claim 21, further including means for comparing the interval between resets with the maximum allowable interval between resets to determine whether a new delay sensitive call can be accepted without the reset interval rising above the maximum allowable interval, and on acceptance of the call, increasing the allocation d for its location.

23. A system as claimed in claim 19, including means for multiplexing message blocks stored in queues at said locations onto said link and for allocating d blocks to each queue.

24. A system as claimed in claim 19, wherein said link comprises a ring and stations are provided at said locations, each station including a controller to give the allocation of d blocks to its station.

25. A system as claimed in claim 19, including means for allowing each location to have a different allocation d of blocks, the allocation for a particular location being variable dependent on message load conditions.

26. A communications network comprising:
   a plurality of stations which can communicate via a ring,
   means for providing information in digital form for transmission from one station to another using message slots which circulate around the ring, each message slot being provided as a first group of control bits and a second group of data bits, each station including means for assuming an active state in which it inserts digitally encoded information into empty slots for transmission to a destination station via the ring,
   means for determining whether a station has transmitted information into d slots, where d is an integer greater than zero and where each station may have a different value for d,
   means for allowing a station to transmit information into an empty slot onto the ring to said destination station provided that d slots have not already been transmitted from said station, irrespective of their time relationship to earlier empty slots and irrespective of whether another station is currently transmitting onto the ring
   means for controlling said station, after it has inserted information into d slots, to enter a state in which it cannot gain access to empty slots for the transmission of information until it is reset in response to recognition of an empty slot having travelled at least once around the ring, said resets being issued to each of said stations so that no station is a preferential position with regard to the rate of reception of resets.

27. A communications network as claimed in claim 26, wherein the control bits of each slot are provided so as to include a bit which when that slot is empty can be set to a particular state by an inhibited station.

28. A communications network as claimed in claim 27, wherein each station includes means for sensing an empty slot having a control bit which is so set and includes means for setting a further control bit, whereby a slot which has two control bits so set operating to carry out said resetting of stations.

29. A communications network as claimed in claim 26, including means at each station for controlling the value for d and for determining whether an increase in insertion rate of data information can be accommodated, said means for controlling being responsive to the interval between resets to increase the value of d provided this interval is less than a predetermined value.

30. A communications multiplexer for multiplexing message blocks on a communications link comprising: a plurality of queues for message blocks to be transmitted onto the communications link,
   control means to give an allocation of d blocks to each queue, wherein each queue may have a different value for d and where d is an integer greater than zero, means for deciding which block should be selected for transmission onto the link if blocks are waiting in two or more queues which have not exhausted their d allocations, the selected block being chosen irrespective of the time relationship to other blocks transmitted on the link from the same queue;

said control means including means for determining if d blocks have already been transmitted onto the link from a queue, and means for allowing a queue to transmit a block onto the communication link provided that d blocks have not already transmitted from said queue, and wherein if d blocks are transmitted onto the link from a queue, that queue is inhibited from transmitting further blocks until a further allocation is received.

31. A multiplexer as claimed in claim 30, wherein the control means comprises a counter for each queue and means for resetting the counters when every queue is inhibited or empty.

32. A multiplexer as claimed in claim 31, wherein a maximum allowable interval between resets is set according to delay requirements with message blocks for time sensitive services.

33. A multiplexer as claimed in claim 32, wherein respective queues are provided for time sensitive services having different maximum delay intervals, and the maximum allowable interval between resets is no greater than the maximum delay interval for the queue having the smallest such interval.

34. A multiplexer as claimed in claim 32, further including means responsive to the number of resets per maximum allowable interval between resets for determining whether a new time sensitive call can be accepted without the reset interval rising above the maximum allowable interval between resets, and on acceptance of the call, increasing the allocation d for its associated queue.

35. A multiplexer as claimed in claim 30, wherein each queue has an assigned priority and the control means polls the queues in priority order.

36. A multiplexer as claimed in claim 30, wherein a queue is provided for non-time sensitive services, said queue having a small, fixed allocation d.

37. A communications network system capable of carrying delay sensitive information, such as voice, together with non-delay sensitive information, such as data, said system including:
  a network link;
  a plurality of stations connected to each other via the link;
  means for providing a number of equal length time slots for allowing said stations to communicate with each other along the link;
  means for allocating d information slots to a station, where d is an integer greater than zero and where each station may have different value for d;
  means for determining whether the d allocation of a station has been used;
  means for transferring information from one of said stations into an empty slot irrespective of its time relationship to earlier empty slots utilized by that station and irrespective of whether another location is currently transmitting onto the link provided that the d allocation of that station has not been used; and
  means for requesting a further allocation of d slots at any station using an empty information slot.

38. A system as claimed in claim 37, wherein a station includes means, operable to monitor transmission through the link, to detect errors in transmission through the link.

39. A system as claimed in claim 37, including means for resetting the d allocation following successful passage of an allocation request throughout the link back to the requesting station and means by which any station may inhibit the successful passage of any allocation request if it has an information slot for transfer and provided the d allocation of that station has not been used.

40. A system as claimed in claim 39, including means for changing the value of the d allocation at a station depending on the time interval between resets at a given station.

41. A system as claimed in claim 39, including means for terminating outstanding trial reallocation requests following a recently instructed reset from another station.

42. A communications network comprising:
  a closed transmission link and a plurality of stations which can communicate via the closed transmission link by means of a plurality of equal length time slots circulating around said link, each of said stations including:
  means for treating an empty slot as a message slot for sending message data for communication to another station;
  means for permitting the transmission of further message data by said station until an allocated d number of slots, where d is an integer greater than zero and where each station may have a different value for d, have been seized by said station irrespective of its time relationship to earlier empty slots utilized by that station and irrespective of whether another station is currently transmitting onto the link, and means for inhibiting the transmission of further message data in response to the seizure of the allocated d slots;
  means for treating a slot as a trial slot for seeking further allocation of the d slots if available dependent on the usage of message slots by the other stations; and
  means for treating a slot as a reset slot for providing a further d allocation for all the stations in response to the successful passage of the trial slot throughout the link.

43. A network as claimed in claim 42, wherein a station includes means operable to act as a monitor to detect errors in transmission throughout the link.

44. A network as claimed in claim 43, wherein the monitor station includes a bit generator for generating a monitor bit for insertion into control data accompanying each message slot.

45. A network as claimed in claim 42, wherein each station includes a load control module to control the value of d dependent on load conditions.

46. A network as claimed in claim 45, wherein the load control module is configured to determine the time interval between successive resets.

47. A network as claimed in claim 42, wherein each station includes an access controller for accessing the link to transmit or receive information therefrom, a transmit buffer for holding information prior to transmission and a receive buffer for holding information received from the link.

48. A network as claimed in claim 47, wherein each station includes means for assembling slot sized synchronous packets from time division multiplexed information sources, such as voice, and means for assembling slot sized asynchronous packets from information sources such as data terminals, and control means for passing the packets dependent on their priority rating.

49. A communications system including:
   a communications link;
   a plurality of stations connected to the link which communicate by means of information slots, each of equal capacity to allow delay and non-delay messages such as voice and data respectively to be transmitted via said link;
   means for allocating an allocation of d blocks to each station, where d is an integer greater than zero and wherein each station may have a different value for d;
   means at each station for determining whether the allocation of d blocks has been used, means at each station for transmitting one block of either a delay or non-delay sensitive message onto the link using an available empty slot received at that station irrespective of its time relationship to earlier available empty slots and provided that the d allocation has not been totally utilized and irrespective of whether another station is currently transmitting onto the link;
   means for providing further allocation of slots for a station; and
   means for preventing allocation of further slots if other stations which have not used their allocation still require slots for transmission.

50. A system as claimed in claim 49, including means for increasing the allocation to stations the minimum allocation to the remaining stations is still attainable.

51. A system as claimed in claim 49, including counter means at each station for determining the number of blocks utilized from the d allocation.

52. A method for carrying delay sensitive and non-delay sensitive messages, such as voice and data respectively, in a communications system having a communications link and a plurality of locations for storing information to be carried in message blocks on the link; said method comprising the steps of:
   providing a plurality of message slots each of equal capacity for transmission on the link;
   providing at each location an allocation of d blocks for the delay or non-delay sensitive messages to be carried in d message slots, where d is an integer greater than zero and where each location may have a different value for d;
   allowing each location to transmit one block of either a delay or non-delay sensitive message onto the link whenever a block is waiting at that location to be sent and an available empty slot is received at that location provided that d blocks have not already been transmitted from its allocation;
   allowing that location to transmit further blocks as further available empty slots are received irrespective of their time relationship to earlier empty slots utilized by that location and irrespective of whether another location is currently transmitting onto the link and without waiting for any other location to have an opportunity to transmit provided that d blocks have not already been transmitted from said location;
   denying entitlement of that location to transmit further blocks until a further allocation is received after d blocks have been transmitted onto the link from the location; and
   using a message slot by any location to test all locations for exhaustion of their allocation or their requirement to transmit, to determine whether a further allocation is permitted to all locations including the requesting location.

53. A method as claimed in claim 52, wherein each location carries out the step of selecting what messages are sent depending on their degree of priority or delay sensitivity.

* * * * *